United States Patent
Li et al.

(10) Patent No.: US 10,162,052 B2
(45) Date of Patent: Dec. 25, 2018

(54) PRE-WARNING METHOD AND VEHICLE RADAR SYSTEM

(71) Applicant: Wistron NeWeb Corporation, Hsinchu (TW)

(72) Inventors: Jeng-Da Li, Hsinchu (TW); Hsin-Lung Hsiao, Hsinchu (TW); Chi-Cheng Kuo, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 365 days.

(21) Appl. No.: 14/700,153

(22) Filed: Apr. 30, 2015

(65) Prior Publication Data
US 2016/0054442 A1 Feb. 25, 2016

(30) Foreign Application Priority Data
Aug. 20, 2014 (TW) .............................. 103128709 A

(51) Int. Cl.
*G01S 13/93* (2006.01)
*G01S 13/42* (2006.01)
(Continued)

(52) U.S. Cl.
CPC .............. *G01S 13/931* (2013.01); *G01S 7/03* (2013.01); *G01S 13/42* (2013.01); *G01S 13/87* (2013.01); *G01S 13/345* (2013.01)

(58) Field of Classification Search
CPC ....................................................... G01S 7/03
(Continued)

(56) References Cited

U.S. PATENT DOCUMENTS 6,992,613 B2 * 1/2006 Yoneda ................. G01S 13/878
342/118
7,592,945 B2 * 9/2009 Colburn ................... G01C 9/00
342/118
(Continued)

FOREIGN PATENT DOCUMENTS

CN 1808177 A 7/2006
CN 2886598 Y 4/2007
(Continued)

OTHER PUBLICATIONS

Guo-Shu Huang et al., Title: Radio-Frequency System, pending U.S. Appl. No. 14/691,547, filed Apr. 20, 2015.
(Continued)

*Primary Examiner* — Marcus E Windrich
(74) *Attorney, Agent, or Firm* — Winston Hsu

(57) ABSTRACT

A pre-warning method utilized in a vehicle radar system includes a first and a second millimeter-wave detection modules detecting dynamic information of a plurality of first targets and a plurality of second targets corresponding to the vehicle radar system in different dimensions of an area and obtaining a first and a second detection results, determining whether there are identical targets within the plurality of first targets and the plurality of second targets according to the first and the second detection results, determining 3-D dynamic information of at least an identical target after determining that the plurality of first targets and the plurality of second targets include the at least an identical target, and determining whether to trigger an alarm signal according to the 3-D dynamic information of the at least an identical target.

12 Claims, 7 Drawing Sheets

(51) Int. Cl.
  *G01S 7/03* (2006.01)
  *G01S 13/87* (2006.01)
  *G01S 13/34* (2006.01)

(58) Field of Classification Search
  USPC .................................................. 342/70–72
  See application file for complete search history.

(56) References Cited

U.S. PATENT DOCUMENTS

| | | | | |
|---|---|---|---|---|
| 7,777,618 B2* | 8/2010 | Schiffmann | ............ | G01S 13/878 |
| | | | | 340/435 |
| 8,818,703 B2* | 8/2014 | Harada | ............... | B60R 21/0134 |
| | | | | 342/173 |
| 8,935,086 B2* | 1/2015 | Sadekar | ........... | G08G 1/096716 |
| | | | | 701/301 |
| 9,283,910 B2* | 3/2016 | Tsunekawa | ......... | B60R 21/0134 |
| 9,297,892 B2* | 3/2016 | Smith | ................ | B60K 31/0008 |
| 2009/0135051 A1 | 5/2009 | Bishop | | |
| 2009/0201192 A1* | 8/2009 | Tokoro | ................ | B60R 21/0134 |
| | | | | 342/70 |
| 2010/0141527 A1* | 6/2010 | Lalezari | ................. | H01Q 21/08 |
| | | | | 342/368 |
| 2011/0080314 A1* | 4/2011 | Wintermantel | ......... | G01S 7/032 |
| | | | | 342/147 |
| 2013/0030687 A1 | 1/2013 | Shida | | |
| 2013/0063297 A1* | 3/2013 | Papziner | ................. | G01S 7/032 |
| | | | | 342/70 |
| 2013/0226432 A1 | 8/2013 | Tsuruta | | |
| 2013/0304365 A1 | 11/2013 | Trombley | | |
| 2014/0139368 A1* | 5/2014 | Takaki | .................. | G01S 13/723 |
| | | | | 342/70 |
| 2014/0297171 A1* | 10/2014 | Minemura | .............. | G08G 1/166 |
| | | | | 701/301 |

FOREIGN PATENT DOCUMENTS

| | | |
|---|---|---|
| CN | 101625797 A | 1/2010 |
| CN | 101354438 B | 12/2011 |
| EP | 1684092 A1 | 7/2006 |

OTHER PUBLICATIONS

Chi-Cheng Kuo et al., Title: Pre-warning Method and Vehicle Radar System, pending U.S. Appl. No. 14/698,867, filed Apr. 29, 2015.

* cited by examiner

PRE-WARNING METHOD AND VEHICLE RADAR SYSTEM

BACKGROUND OF THE INVENTION

1. Field of the Invention

The present invention relates to a pre-warning method and a vehicle radar system, and more particularly, to a pre-warning method and a vehicle radar system capable of detecting target information in different dimensions.

2. Description of the Prior Art

As traffic safety is more important, vehicle safety equipment is getting more various. In addition to active or passive safety systems (such as anti-lock braking system, electronic brake-force distribution system, traction control system, electronic stability system, supplementary restraint system, etc.), pre-warning protection systems attract more attention. The pre-warning protection system uses an image self-recognition method of machine vision to detect possible situation which may cause danger, and sends out a warning light signal or an alarm sound to a driver in advance. The driver may change a driving direction according to the alarm signals, to avoid a traffic accident due to the driver's careless or blind side of vision.

Common pre-warning protection systems, such as an automatic cruise control, a blind spot detection system, an automatic braking system, a forward/rear collision warning system, a lane departure warning system, utilize frequency-modulated continuous waveform (FMCW) radar system in microwave form to perform target detections. These detections are performed by radar systems to transmit millimeter wave signals, receive reflected signals from targets, and compute information such as moving speeds, angles, ranges of the targets in relation to the radar system. In addition, to fit driving requirements, detecting ranges of the vehicle radar systems usually extend toward horizontal direction. In other words, the vehicle radar systems have detecting capability only in horizontal (Azimuth) dimension, so as to detect targets in driving direction.

Since the vehicle radar systems in the prior art have detecting capability only in horizontal dimension, if there are targets with high or low elevation angles, such as traffic signs, road signs, notice boards, pedestrian bridges, billboards, manhole covers, road humps, etc., the vehicle radar systems may make a false alarm, which may cause disturbance of drivers and unpredictable dangers. For example, please refer to FIG. 1, which is a schematic diagram of a forward collision warning system according to the prior art. As shown in FIG. 1, vehicles A, B drive in a road way S. According to a driving direction, the vehicle A is in front of the vehicle B. A front collision warning system is installed on a front of vehicle B, which detects traffic condition in the front and forms a radar range RG. Therefore, when the vehicle B is driving, the front collision warning system of the vehicle B keeps detecting target conditions within the radar range RG. Once a chance of collision is detected, the front collision warning system would alert or activate an automatic break mechanism. However, since the vehicle radar systems in the prior art have detecting capability only in horizontal dimension, target information in the vertical dimension would not be distinguished. Therefore, take FIG. 1 for example, when the front collision warning system of the vehicle B detects a road sign C, the front collision warning system may determine that the road sign C is on the driving road way, and send out an alert. Furthermore, the front collision warning system may activate an automatic break, which may cause dangers of colliding by the rear vehicles.

As can be seen, since the vehicle radar systems of the prior art detect target information only in horizontal dimension, miss detections and false alarms might happen because of external traffic and environment. Therefore, how to enhance a pre-warning accuracy of the vehicle pre-warning systems is a significant objective in the field.

SUMMARY OF THE INVENTION

It is therefore a primary objective of the present invention to provide a pre-warning method and a vehicle radar system to improve disadvantages of the prior art.

An embodiment of the present invention discloses a pre-warning method, utilized in a vehicle radar system comprising a first millimeter-wave detection module and a second millimeter-wave detection module. The pre-warning method comprises detecting dynamic information of a plurality of first targets in a first dimension within an area corresponding to the vehicle radar system, to obtain a first detection result; detecting dynamic information of a plurality of second targets in a second dimension within the area corresponding to the vehicle radar system, to obtain a second detection result, wherein the first dimension is different from the second dimension; determining whether there are identical targets within the plurality of first targets and the plurality of second targets according to the first detection result and the second detection result; after determining that the plurality of first targets and the plurality of second targets comprise at least an identical target, determining a 3-dimensional (3-D) dynamic information of the at least an identical target; and determining whether to trigger an alarm signal according to the 3-D dynamic information of the at least an identical target.

An embodiment of the present invention further discloses a vehicle radar system, utilized for a vehicle. The vehicle radar system comprises a substrate, comprising a first plane and a second plane; an antenna module, comprising a plurality of antenna strings, formed on the first plane of the substrate, each comprising a plurality of radiating units connected in a sequence, wherein the plurality of antenna strings are classified into a first group and a second group; a plurality of wires, formed on the second plane of the substrate, for transmitting radio-frequency (RF) signals; a plurality of connecting units, disposed in the substrate, for coupling the plurality of wires and antenna strings of the second group within the plurality of antenna strings; a first millimeter-wave detection module, coupled to antenna strings of the first group within the plurality of antenna strings, for transmitting or receiving RF signals via the antenna strings of the first group, to detect dynamic information of a plurality of first targets in a first dimension within an area corresponding to the vehicle, so as to obtain a first detection result; a second millimeter-wave detection module, coupled to the plurality of wires, for coupling to the antenna strings of the second group through the plurality of wires and the plurality of connecting units, to detect dynamic information of a plurality of second targets in a second dimension within the area corresponding to the vehicle, so as to obtain a second detection result, wherein the first dimension is different from the second dimension; and a data fusion unit, for determining whether there are identical targets within the plurality of first targets and the plurality of second targets according to the first detection result and the second detection result; after determining that the plurality of first targets and the plurality of second targets comprise at least an identical target, determining a 3-D dynamic information of the at least an identical target; and determining whether to trigger an alarm signal according to the 3-D dynamic information of the at least an identical target; wherein when the first millimeter-wave detection module transmits or receives RF signals via the antenna strings of the first group, a first electric field generated by the antenna strings of the first group extends toward a first direction, and when the second millimeter-wave detection module transmits or receives RF signals via the antenna strings of the second group, a second electric field generated by the antenna strings of the second group extends toward a second direction different from the first direction; wherein at least an antenna string of the plurality of antenna strings belongs to both the first group and the second group.

These and other objectives of the present invention will no doubt become obvious to those of ordinary skill in the art after reading the following detailed description of the preferred embodiment that is illustrated in the various figures and drawings.

DETAILED DESCRIPTION

Since the conventional vehicle radar systems detect targets information only in horizontal dimension, miss detections and false alarms might happen because of external traffic and environment. In order to enhance an accuracy of the vehicle radar systems, the present invention determines three dimensional (3-D) dynamic information of targets through detecting target information in both horizontal dimension and vertical dimension, to avoid miss detections and false alarms caused by external environment and enhance pre-warning accuracy.

Figure 2:
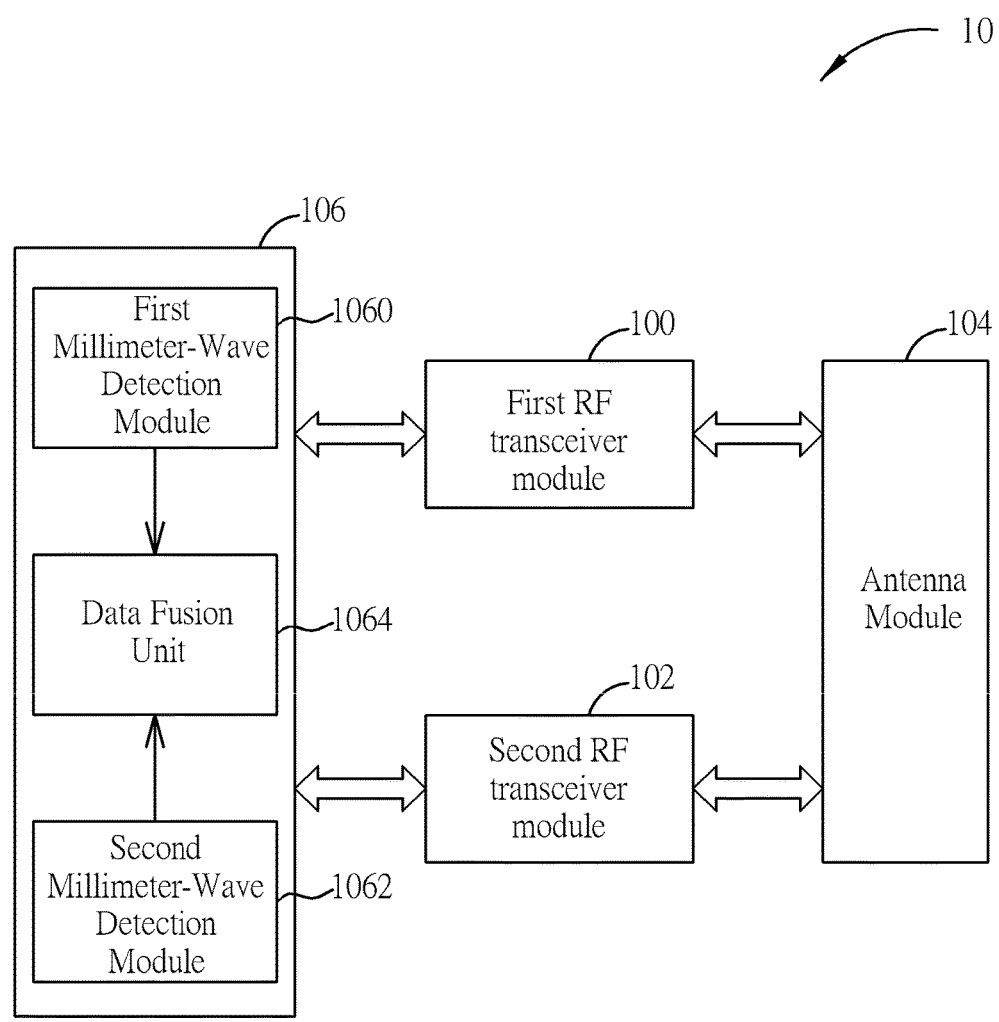
FIG. 2 is a schematic diagram of a vehicle radar system according to an embodiment of the present invention.

Please refer to FIG. 2, which is a schematic diagram of a vehicle radar system 10 according to an embodiment of the present invention. The vehicle radar system 10 may detect roadway environment and alarm possible traffic situations in advance, so as to enhance pre-warning accuracy. The vehicle radar system 10 comprises a first radio-frequency (RF) transceiver module 100, a second RF transceiver module 102, an antenna module 104 and a signal processing module 106. The antenna module 104 comprises one or more receiving antennas and one or more transmitting antennas, which are shared by the first RF transceiver module 100 and the second RF transceiver module 102, to perform roadway environment detection. The first RF transceiver module 100 and the second RF transceiver module 102 may respectively comprise components such as wires, power dividers, etc., and share the antenna module 104 through arrangement using connecting lines to achieve polarization of different directions, i.e., horizontal polarization and vertical polarization. Moreover, the signal processing module 106 comprises a first millimeter-wave detection module 1060, a second millimeter-wave detection module 1062 and a data fusion unit 1064. The first millimeter-wave detection module 1060 may transmit and receive millimeter-wave signals via the first RF transceiver module 100 and the antenna module 104 to perform operations of target detection and estimation of ranges, speeds and angles of targets. Similarly, the second millimeter-wave detection module 1062 may transmit and receive millimeter-wave signals via the second RF transceiver module 102 and the antenna module 104 to perform operations of target detection and estimation of ranges, speeds and angles of targets.

Figure 6:
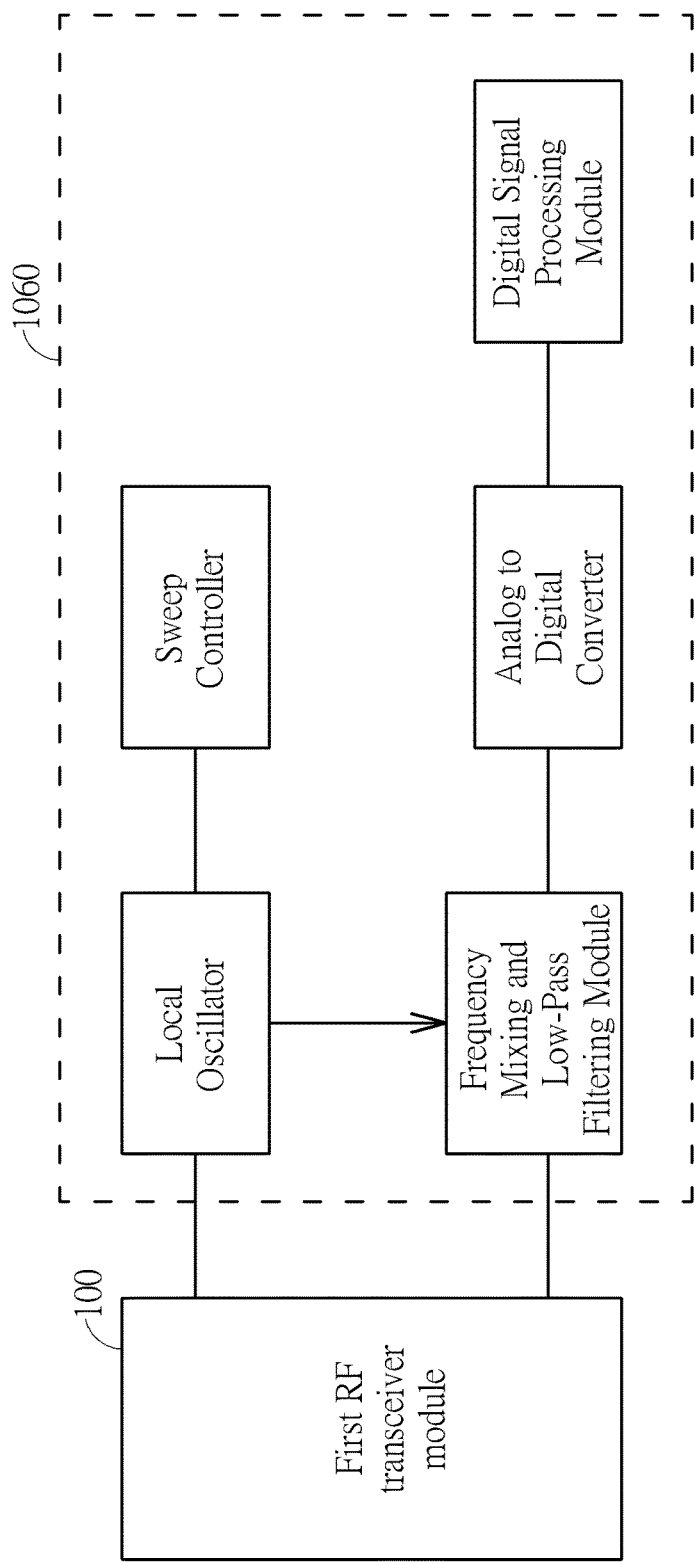
FIG. 6 is a schematic diagram of an embodiment of a first millimeter-wave detection module in FIG. 1.

Utilizing millimeter wave wireless signal to sense targets is known in the art, which is briefly narrated as follows. In an embodiment, as shown in FIG. 6 (only the first millimeter-wave detection module 1060 is shown), the first millimeter-wave detection module 1060 comprises components such as a local oscillator, a sweep controller, a frequency mixing and low-pass filtering module, an analog to digital converter, a digital signal processing module, etc. Moreover, the sweep controller controls the local oscillator to generate FMCW signals or other extensions of FMCW signals, and emits the FMCW signals outward through the first RF transceiver module 100 and the antenna module 104. Correspondingly, after the first RF transceiver module 100 and the antenna module 104 receive signals reflected from targets, the frequency mixing and low-pass filtering module performs frequency mixing on the reflected signals with the sinusoidal signal generated by the local oscillator and performs low-pass filtering, to obtain beat frequency between these two signals. The analog to digital converter converts the beat frequency signals into digital signals. The digital signal processing module computes and obtains information such as ranges, moving speeds, angles, etc., of the targets in relation to the vehicle radar system 10.

Figure 1:
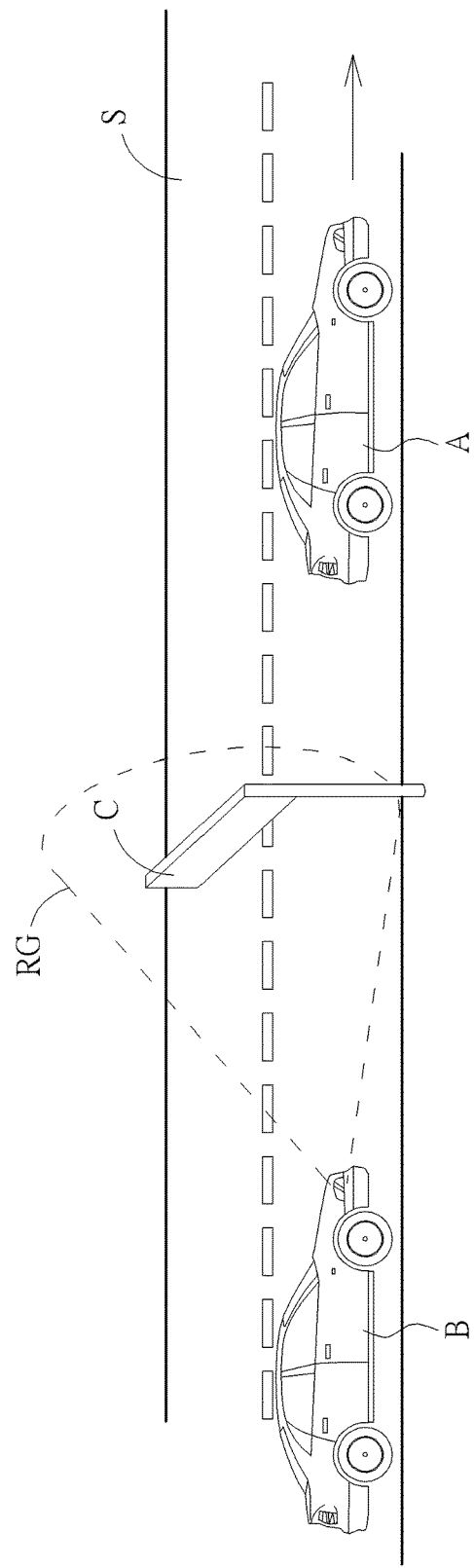
FIG. 1 is a schematic diagram of a forward collision warning system according to the prior art.

Therefore, in the signal processing module 106, the first millimeter-wave detection module 1060 and the second millimeter-wave detection module 1062 share the antenna module 104, and detect dynamic information (e.g., ranges, moving speeds, angles, etc.) of targets in relation to the vehicle radar system 10. The data fusion unit 1064 may integrate the results obtained from the first millimeter-wave detection module 1060 and the second millimeter-wave detection module 1062, and determine 3-D dynamic information of the targets, so as to produce an alarm signal ALM adequately. In detail, since the first RF transceiver module 100 and the second RF transceiver module 102 make the antenna module 104 radiate in different polarization directions, the first millimeter-wave detection module 1060 and the second millimeter-wave detection module 1062 detect target information in different dimensions through the first RF transceiver module 100 and the second RF transceiver module 102. For example, the first millimeter-wave detection module 1060 may detect target information in horizontal dimension, while the second millimeter-wave detection module 1062 may detect target information in vertical dimension. In such a situation, if a same target is within both detecting ranges of the first millimeter-wave detection module 1060 and the second millimeter-wave detection module 1062, the data fusion unit 1064 may obtain both horizontal and vertical dynamic information of the target within a same signal period, integrate the horizontal and vertical dynamic information, so as to compute information such as a range, a moving speed, an azimuth angle, an elevation angle, etc., of the target. That is, 3-D dynamic information of the target is obtained. Therefore, the vehicle radar system 10 may distinguish cars on the road and ghost targets with high or low elevation angles (e.g., the road sign C illustrated in FIG. 1), so as to avoid false alarm.

More specifically, since the first millimeter-wave detection module 1060 and the second millimeter-wave detection module 1062 share the antenna module 104 to achieve different polarization directions, the first millimeter-wave detection module 1060 and the second millimeter-wave detection module 1062 may detect target information within a same area in different dimensions. Furthermore, the data fusion unit 1064 may integrate target information in different dimensions, and determine locations and moving speeds of targets in 3-D space. Thereby, miss detections or false alarms, caused by detecting only in horizontal dimension as the conventional art and affected by the environment, are avoided.

Notably, the vehicle radar system 10 is an embodiment of the present invention, and not limited herein. Methods, which involve determining 3-D dynamic information of targets according to dynamic information in different dimensions, are within the scope of the present invention. For example, the antenna module 104 is shared by the first RF transceiver module 100 and the second RF transceiver module 102, which is because that limited antenna disposal space in general vehicles are considered. In fact, the antenna module 104 may comprise multiple independent antennas, which are independently utilized by the first RF transceiver module 100 and the second RF transceiver module 102. In addition, utilizing the first RF transceiver module 100 and the second RF transceiver module 102 to achieve different polarization directions is for exemplary purpose. Since horizontal polarization signals and vertical polarization signal are mutually orthogonal, in ideal condition, the received signals of the horizontal polarization signals and the vertical polarization signals would not interfere with each other, such that efficiency is enhanced. However, if applied systems do not take this issue into consideration, non-orthogonal polarization or a same polarization direction may be adopted to realize the first RF transceiver module 100 and the second RF transceiver module 102, as long as dynamic information of a same target in different dimensions is sure to be obtained.

Figure 3:
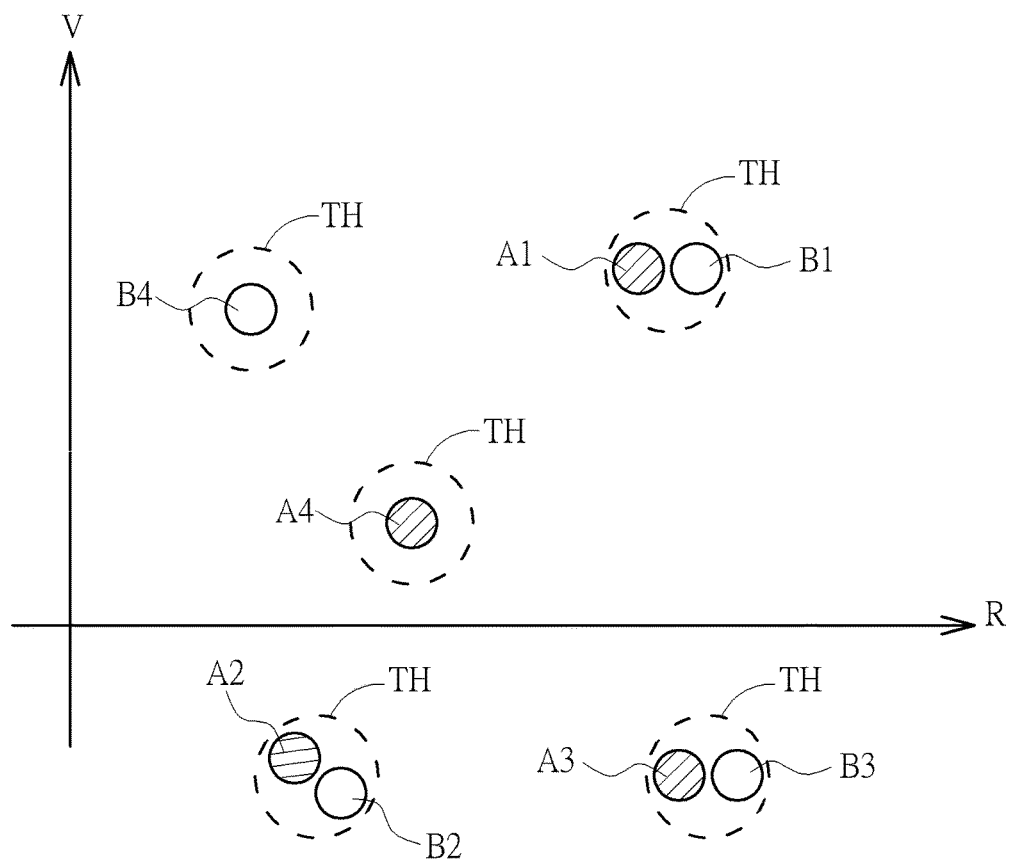
FIG. 3 is a schematic diagram of an embodiment of a data fusion unit shown in FIG. 2 when determining the same targets.

Furthermore, the vehicle radar system 10 may be interfered by environment noise since external environment of the vehicle changes as the vehicle moves, or the vehicle radar system 10 may be interfered by other internal electronics components, e.g., ignition system, generator, wipers, electric windows, electric seats, air conditioner, radio, fuel supply system, clutch system, etc. Thus, in the detection results of the first millimeter-wave detection module 1060 and the second millimeter-wave detection module 1062, dynamic information of the same targets may be deviated. In such a situation, the data fusion unit 1064 may set a threshold value for excluding outside interference. For example, please refer to FIG. 3, which is a schematic diagram of an embodiment of the data fusion unit 1064 when determining the same targets. In FIG. 3, A1-A4 represent target dynamic information detected by the first millimeter-wave detection module 1060, and B1-B4 represent target dynamic information detected by the second millimeter-wave detection module 1062. Since A1-A4 and B1-B4 includes velocities (V) and ranges (R) in relation to the vehicle radar system 10, A1-A4 and B1-B4 may be illustrated on a coordinate system consisting of velocity and range. In addition, in FIG. 3, regions TH represent scopes within the threshold value. In other words, when the data fusion unit 1064 receives the detection results of the first millimeter-wave detection module 1060 and the second millimeter-wave detection module 1062, the data fusion unit 1064 may determine whether same targets are detected by the first millimeter-wave detection module 1060 and the second millimeter-wave detection module 1062 by comparing the detection results of the first millimeter-wave detection module 1060 and the second millimeter-wave detection module 1062 to see if there are dynamic information located within the regions TH. For example, in an embodiment, the data fusion unit 1064 may base on A1-A4 first and individually determine whether distances in the velocity-range coordinate system between each of the dynamic information A1-A4 and the closet dynamic information B1-B4 are within the regions TH. Take FIG. 3 as an example, the distance between the dynamic information A1 and the closest dynamic information B1 is smaller than the region TH, the distance between the dynamic information A2 and the closest dynamic information B2 is smaller than the region TH, and the distance between the dynamic information A3 and the closest dynamic information B3 is smaller than the region TH. Thereby, the dynamic information A1-A3 and the dynamic information B1-B3 respectively corresponding to the same targets are determined, and association and tracking on the targets are further performed. Since the detection results of the first millimeter-wave detection module 1060 and the second millimeter-wave detection module 1062 respectively correspond to different dimensions, i.e., the dynamic information A1-A3 and the dynamic information B1-B3 respectively represent the target information in horizontal dimension and vertical dimension, the data fusion unit 1064 may integrate the dynamic information A1-A3 and the dynamic information B1-B3, obtain information such as the ranges, the relative speeds, the azimuth angles, the elevation angles of the targets, and use the formula transforming from polar coordinate to rectangular coordinate to obtain the 3-D coordinate of the targets.

In addition, in FIG. 3, there is no other dynamic information in the regions TH of the dynamic information A4, B4, which may be regarded as possible ghost targets. In an embodiment, these possible ghost targets may be paired with the tracking targets on hand. If a tracking target with a close coordinate and a close speed is paired for a specific number of periods, the possible ghost target is regarded as normal target, and association and tracking are performed on the target. Otherwise, the possible ghost targets are confirmed as the ghost targets and excluded. In addition to basing on the dynamic information A1-A4 first and determining the relations of the dynamic information A1-A4 with the dynamic information B1-B4, determination may also be made based on the dynamic information B1-B4, which is also within the scope of the present invention.

After the target information is determined, the data fusion unit 1064 may determine whether the targets lie within a predefined alert region. Notably, the alert region may be a static region or a dynamic region with a certain moving speed according to different applications. Take application to blind spot detection as an example, if a target lies in a blind spot region, alert condition is satisfied. Take application to forward collision warning as an example, if a target lies in a forward collision region and a relative speed of which is smaller than a predefined rule, alert condition is satisfied. In addition, determining whether a target lying within the alert region may use a two-stage determining process. For example, the data fusion unit 1064 may first determine whether a target lies within the alert region in horizontal dimension, and further determine whether the target lies within the alert region in vertical dimension after the target lying in the alert region in horizontal dimension is confirmed. If the two are both satisfied, the target is confirmed as lying within the alert region. Certainly, a single-stage determining process may also be used. The alert region included 3-D information. The data fusion unit 1064 compares the 3-D dynamic information of the target with the alert region, and determines directly whether the target lies in the alert region. Furthermore, to prevent false alarm, an alert may be provided if a frequency of a target lying in the alert region during a specific number of periods is greater than a specific value.

Figure 4:
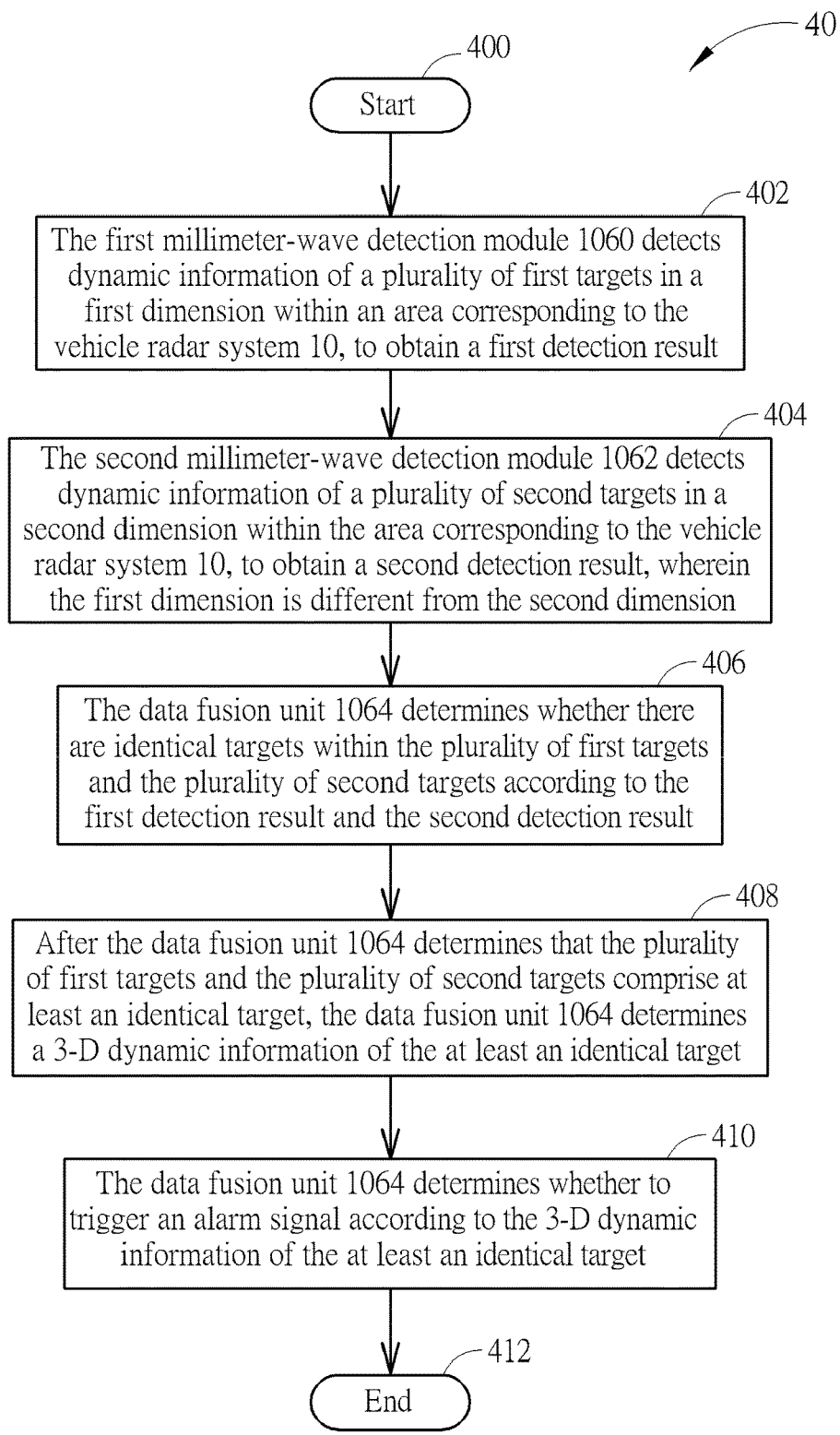
FIG. 4 is schematic diagram of a pre-warning process according to an embodiment of the present invention.

The operations of the vehicle radar system 10 stated in the above are further summarized as a pre-warning process 40, as shown in FIG. 4. The pre-warning process 40 comprises following steps:

Step 400: Start.

Step 402: The first millimeter-wave detection module 1060 detects dynamic information of a plurality of first targets in a first dimension within an area corresponding to the vehicle radar system 10, to obtain a first detection result.

Step 404: The second millimeter-wave detection module 1062 detects dynamic information of a plurality of second targets in a second dimension within the area corresponding to the vehicle radar system 10, to obtain a second detection result, wherein the first dimension is different from the second dimension.

Step 406: The data fusion unit 1064 determines whether there are identical targets within the plurality of first targets and the plurality of second targets according to the first detection result and the second detection result.

Step 408: After the data fusion unit 1064 determines that the plurality of first targets and the plurality of second targets comprise at least an identical target, the data fusion unit 1064 determines a 3-D dynamic information of the at least an identical target.

Step 410: The data fusion unit 1064 determines whether to trigger an alarm signal according to the 3-D dynamic information of the at least an identical target.

Step 412: End.

The detail descriptions and alternations of the pre-warning process 40 may be referred to the paragraph stated in the above. For example, in Step 406, the data fusion unit 1064 determines whether there are identical targets in the detection results of the first millimeter-wave detection module 1060 and the second millimeter-wave detection module 1062. According to the description in the above, the data fusion unit 1064 may compare the target dynamic information to see if a speed and range difference thereof is smaller than a specific threshold value. Furthermore, in Step 410, the data fusion unit 1064 determines whether to trigger an alarm signal according to the 3-D dynamic information. According to the description in the above, the data fusion unit 1064 may first determine whether a target lies within the alert region in horizontal dimension, and further determine whether the target lies within the alert region in vertical dimension after the target lying in the alert region in horizontal dimension is confirmed. If the two are both satisfied, the target is confirmed as lying within the alert region. Meanwhile, the data fusion unit 1064 may also provide an alert if a frequency of a target lying in the alert region during a specific number of periods is greater than a specific value.

Figure 5A:
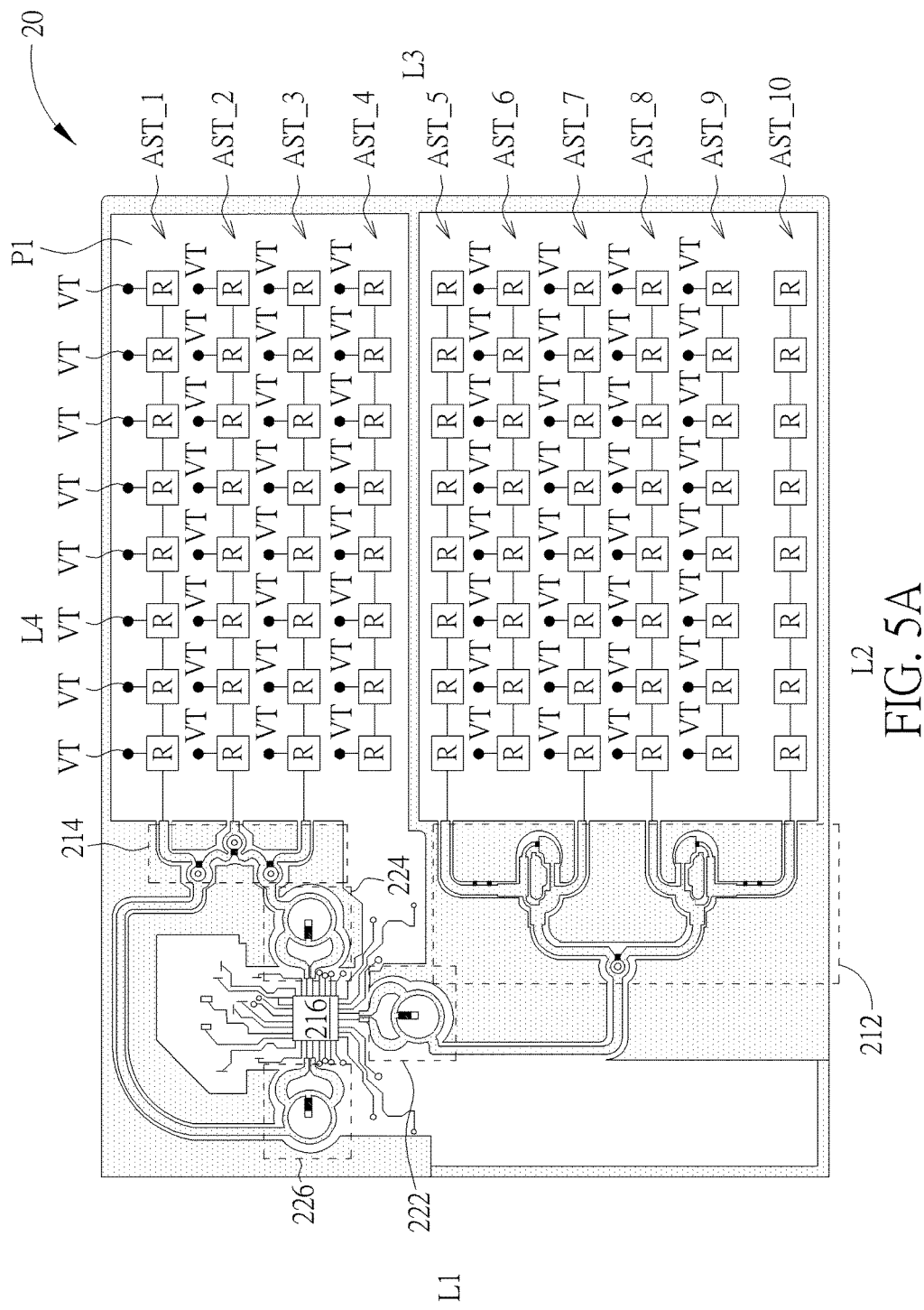
FIGS. 5A and 5B are schematic diagrams of a radio-frequency system according to an embodiment of the present invention.
Figure 5B:
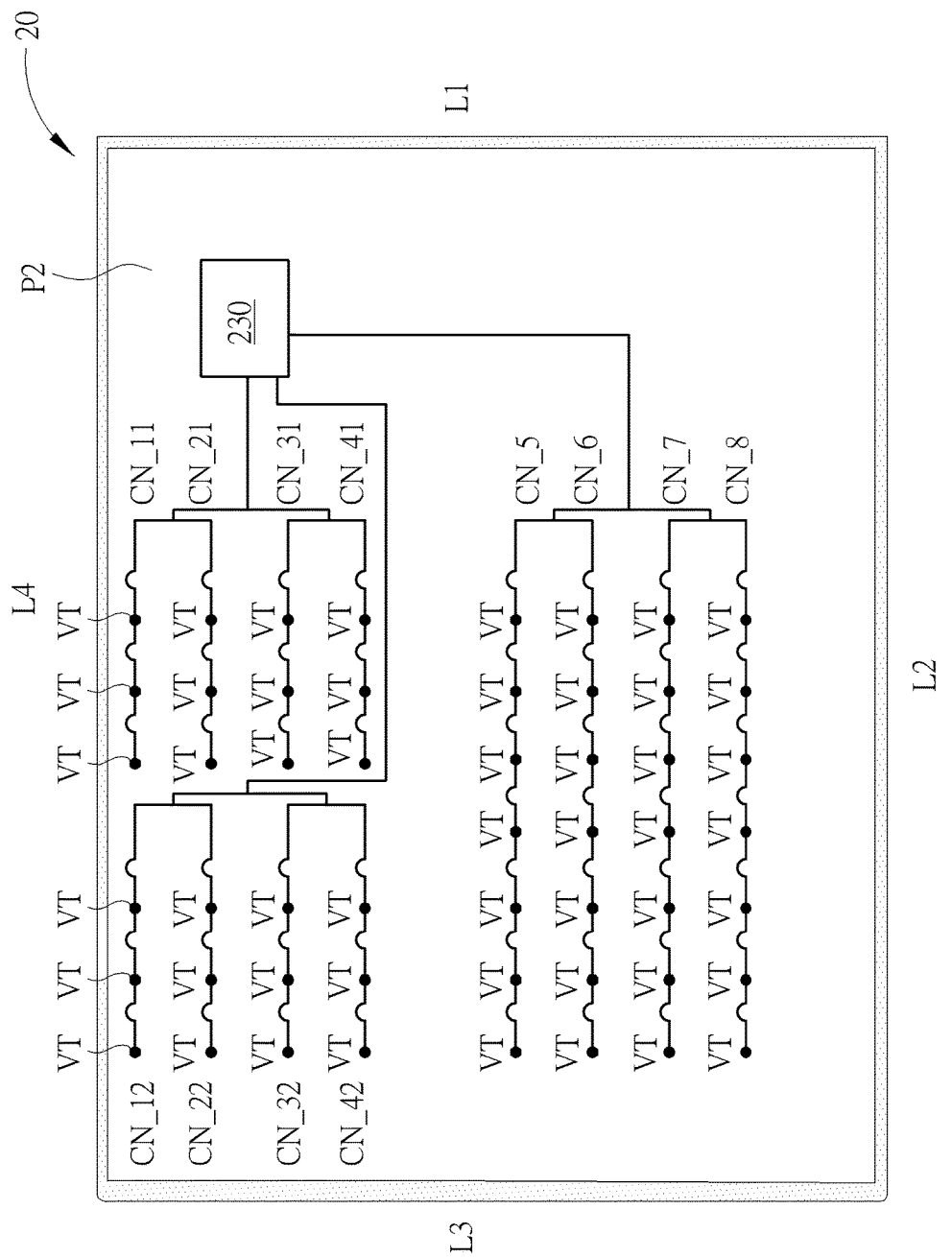

Implementations of the vehicle radar system 10 are not limited to any specific structure. For example, applicant discloses a sharing antenna and an RF device producing polarizations in different directions in U.S. patent application Ser. No. 14/691,547, which may be applied to the vehicle radar system 10 of the present invention. For example, please refer to FIGS. 5A and 5B. FIGS. 5A and 5B are FIGS. 2A and 2B in U.S. patent application Ser. No. 14/691,547, which illustrate schematic diagrams of a first plane P1 and a second plane P2 of an RF system 20. According to U.S. patent application Ser. No. 14/691,547, four sides L1-L4 are also annotated in the RF system 20 to distinguish the illustrated directions of the first plane P1 and the second plane P2. The RF system 20 comprises 10 antenna strings AST_1-AST_10, and each of the antenna strings AST_1-AST_10 comprises 8 radiation elements R. In addition to the antenna strings AST_1-AST_10 on the first plane P1 of the RF system 20, the RF system 20 further disposes a transmit power divider 212, a receive power divider 214, a first RF processing module 216 and ring-shaped couplers 222, 224, 226. Moreover, the first RF processing module 216 is coupled to the antenna strings AST_1-AST_3, AST_5, AST_7, AST_8, AST_10 through the transmit power divider 212 and the receive power divider 214, to realize a one transmit two receive (1T2R) operation. In other words, RF signals received by the antenna strings AST_1-AST_3 are delivered to two receiving terminals of the first RF processing module 216 (wherein the antenna string AST_2 are shared by the two receiving terminals of the first RF processing module 216), and RF signals outputted by a transmitting terminal of the first RF processing module 216 are emitted to the air through the antenna strings AST_5, AST_7, AST_8, AST_10. For brevity, the antenna strings AST_1-AST_3, AST_5, AST_7, AST_8, AST_10, which are connected to the first RF processing module 216, are classified as a first group of antenna strings. On the other hand, the RF system 20 disposes a second RF processing module 230 and wires CN_11, CN_12, CN_21, CN_22, CN_31, CN_32, CN_41, CN_42, CN_5-CN_8 on the second plane P2, and is coupled to the antenna strings AST_1-AST_4, AST_6-AST_9 through the connecting units VT. For brevity, the antenna strings AST_1-AST_4, AST_6-AST_9, which are connected to the second RF processing module 230, are classified as a second group of antenna strings.

As can be seen from the above, the antenna strings AST_1-AST_3, AST_7, AST_8 belong to both the first group and the second group of antenna strings. In other words, the first RF processing module 216 and the second RF processing module 230 share a part of antenna strings within the antenna strings AST_1-AST_10 (i.e., AST_1-AST_3, AST_7, AST_8). In addition, the wires CN_11, CN_12 of the RF system 20 corresponds to two segments of the same antenna string AST_1, the wires CN_21, CN_22 corresponds to two segments of the same antenna string AST_2, the wires CN_31, CN_32 corresponds to two segments of the same antenna string AST_3, and the wires CN_41, CN_42 corresponds to two segments of the same antenna string AST_4. The wires CN_11, CN_21, CN_31, CN_41 are connected to the same receiving terminal of the second RF processing module 230, the wires CN_12, CN_22, CN_32, CN_42 are connected to another receiving terminal of the second RF processing module 230, and the wires CN_5-CN_8 are connected to a transmitting terminal of the second RF processing module 230. In other words, the second RF processing module 230 is coupled to the antenna strings AST_1-AST_4, AST_6-AST_9 through the wires CN_11, CN_12, CN_21, CN_22, CN_31, CN_32, CN_41, CN_42, CN_5-CN_8 and the connecting units VT, to realize the 1T2R operation.

Therefore, the first RF processing module 216 may realize the 1T2R operation through the antenna strings AST_1-AST_3, AST_5, AST_7, AST_8, AST_10, and the second RF processing module 230 may realize the 1T2R operation through the antenna strings AST_1-AST_4, AST_6-AST_9. In other words, the RF system 20 utilizes the original 1T2R array antennas to achieve a two transmit four receive (2T4R) operation by using the sharing antenna strings. Required disposal space is spared, which is suitable for space-limited applications such as vehicle radar system.

In addition, when the first RF processing module 216 performs the 1T2R operation, the radiation elements R of each antenna string of the antenna strings AST_1-AST_3, AST_5, AST_7, AST_8, AST_10 are connected in series. When the second RF processing module 230 performs the 1T2R operation, the radiation elements R of each antenna string of the antenna strings AST_1-AST_4, AST_6-AST_9 are connected in parallel. In such a situation, when the first RF processing module 216 and the second RF processing module 230 perform operations, the RF system 20 may generate different directions of polarization. For example, through proper arrangements, if the RF system 20 presents horizontal polarization when the first RF processing module 216 operates, i.e., a first electric field generated by the antenna strings AST_1-AST_3, AST_5, AST_7, AST_8, AST_10 extends toward horizontal direction, then the RF system 20 presents vertical polarization when the second RF processing module 230 operates, i.e., a second electric field generated by the antenna strings AST_1-AST_4, AST_6-AST_9 extends toward vertical direction.

Using the RF system 20 of FIG. 5A and FIG. 5B may realize the vehicle radar system 10. In detail, the antenna module 104 may be implemented by the antenna strings AST_1-AST_10. The first millimeter-wave detection module 1060 and the second millimeter-wave detection module 1062 may be implemented by the first RF processing module 216 and the second RF processing module 230 respectively. The first RF transceiver module 100 may be implemented by the transmit power divider 212, the receive power divider 214 and the ring-shaped couplers 222, 224, 226. The second RF transceiver module 102 may be implemented by the wires CN_11, CN_12, CN_21, CN_22, CN_31, CN_32, CN_41, CN_42, CN_5-CN_8 and the connecting units VT. In such a situation, the signal processing module 106 is implemented by adding the data fusion unit 1064 connecting to the first RF processing module 216 and the second RF processing module 230 on the RF system 20, and a basic structure of the vehicle radar system 10 is formed. Furthermore, by incorporating the pre-warning process 40 and its alternations to modify the operations of the first RF processing module 216 and the second RF processing module 230, the vehicle radar system 10 is realized.

Notably, the realization of the vehicle radar system 10 is not limited to FIGS. 2A and 3B in U.S. patent application Ser. No. 14/691,547. Adequate modification may be made according to relative content of U.S. patent application Ser. No. 14/691,547. For example, the RF system may be derived to achieve a three transmit six receive (3T6R) operation, a four transmit eight receive (4T8R) operation, etc. In addition, realization methods which achieve sharing antennas and different polarization directions are all applied to the present invention, and not limited to the embodiments stated in the above. In addition, detecting structures which realize the first millimeter-wave detection module 1060 and the second millimeter-wave detection module 1062 are not limited to FMCW systems. The frequencies and the frequency hopping patterns of the RF signals thereof may be the same or different. Operational frequency band may also be the same or different.

In the conventional art, since traditional vehicle radar systems detect target information only in horizontal dimension, miss detections or false alarms might happen due to environment. In comparison, the present invention detects target information in both horizontal dimension and vertical dimension, such that ranges, moving speeds, azimuth angles, elevation angles of the targets may be obtained within a same signal period, so as to distinguish targets with high and low elevation angles and exclude target which is not in the same horizontal plane. Therefore, false alarms are reduced, reliability of the radar system is improved, and traffic safety is enhanced. In addition, the present invention has less limitation on radar detecting range and beam angle, which simplifies calibration process and installation process.

In summary, the present invention may effectively enhance the reliability of the vehicle radar system and traffic safety, and simplify calibration process and installation process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pre-warning method, utilized in a vehicle radar system comprising a first millimeter-wave detection module, a second millimeter-wave detection module and a plurality of radiating units, wherein the plurality of radiating units form a plurality of antenna strings, radiating units of each antenna string are connected in a sequence, and the plurality of antenna strings are classified into a first group and a second group, the pre-warning method comprising:

the first millimeter-wave detection module and antenna strings of the first group within the plurality of antenna strings radiating in a horizontal polarization to detect dynamic information of a plurality of first targets in an azimuth dimension within an area corresponding to the vehicle radar system, to obtain a first detection result, wherein the azimuth dimension has a first direction, and when the first millimeter-wave detection module transmits or receives RF signals to detect the dynamic information of the plurality of first targets via the antenna strings of the first group, a first electric field generated by the antenna strings of the first group extends toward the first direction;

the second millimeter-wave detection module and antenna strings of the second group within the plurality of antenna strings radiating in a vertical polarization to detect dynamic information of a plurality of second targets in an elevation dimension within the area corresponding to the vehicle radar system, to obtain a second detection result, wherein the azimuth dimension is orthogonal to the elevation dimension, the elevation dimension has a second direction, and when the second millimeter-wave detection module transmits or receives RF signals to detect the dynamic information of the plurality of second targets via the antenna strings of the second group, a second electric field generated by the antenna strings of the second group extends toward the second direction;

determining whether there are identical targets within the plurality of first targets and the plurality of second targets according to the first detection result and the second detection result;

after determining that the plurality of first targets and the plurality of second targets comprise at least an identical target, determining a 3-dimensional (3-D) dynamic information of the at least an identical target; and determining whether to trigger an alarm signal according to the 3-D dynamic information of the at least an identical target;

wherein at least an antenna string of the plurality of antenna strings belongs to both the first group and the second group.

2. The pre-warning method of claim 1, wherein determining whether there are identical targets within the plurality of first targets and the plurality of second targets according to the first detection result and the second detection result is determining that a first target within the plurality of first targets and a second target within the plurality of second targets are identical targets when the first detection result and the second detection result indicate that a difference between a first dynamic information of the first target and a second dynamic information of the second target is smaller than a threshold value.

3. The pre-warning method of claim 1, wherein determining the 3-D dynamic information of the at least an identical target is determining a dynamic information in 3-D space of the at least an identical target corresponding to the vehicle radar system according to the dynamic information of the at least an identical target in the azimuth dimension and the elevation dimension.

4. The pre-warning method of claim 1, wherein dynamic information of the plurality of first targets or the plurality of second targets corresponding to the vehicle radar system are selected from one or more of positions, distances, angles and velocities of the plurality of first targets or the plurality of second targets corresponding to the vehicle radar system.

5. A vehicle radar system, utilized for a vehicle, the vehicle radar system comprising:
   a substrate, comprising a first plane and a second plane;
   a plurality of radiating units, formed on the first plane of the substrate, and forming a plurality of antenna strings, wherein radiating units of each antenna string are connected in a sequence, and the plurality of antenna strings are classified into a first group and a second group;
   a plurality of wires, formed on the second plane of the substrate, for transmitting radio-frequency (RF) signals;
   a plurality of connecting units, disposed in the substrate, for coupling the plurality of wires and antenna strings of the second group within the plurality of antenna strings;
   a first millimeter-wave detection module, coupled to antenna strings of the first group within the plurality of antenna strings, for transmitting or receiving RF signals via the antenna strings of the first group, to radiate in a horizontal polarization to detect dynamic information of a plurality of first targets in an azimuth dimension within an area corresponding to the vehicle, so as to obtain a first detection result, wherein the azimuth dimension has a first direction;
   a second millimeter-wave detection module, coupled to the plurality of wires, for coupling to the antenna strings of the second group through the plurality of wires and the plurality of connecting units, to radiate in a vertical polarization to detect dynamic information of a plurality of second targets in an elevation dimension within the area corresponding to the vehicle, so as to obtain a second detection result, wherein the azimuth dimension is orthogonal to the elevation dimension, and the elevation dimension has a second direction; and
   a data fusion unit, for determining whether there are identical targets within the plurality of first targets and the plurality of second targets according to the first detection result and the second detection result; after determining that the plurality of first targets and the plurality of second targets comprise at least an identical target, determining a 3-D dynamic information of the at least an identical target; and determining whether to trigger an alarm signal according to the 3-D dynamic information of the at least an identical target;
   wherein when the first millimeter-wave detection module transmits or receives RF signals via the antenna strings of the first group, a first electric field generated by the antenna strings of the first group extends toward the first direction, and when the second millimeter-wave detection module transmits or receives RF signals via the antenna strings of the second group, a second electric field generated by the antenna strings of the second group extends toward the second direction different from the first direction;
   wherein at least an antenna string of the plurality of antenna strings belongs to both the first group and the second group.

6. The vehicle radar system of claim 5, wherein the first millimeter-wave detection module is formed on the first plane of the substrate.

7. The vehicle radar system of claim 5, wherein the second millimeter-wave detection module is formed on the second plane of the substrate.

8. The vehicle radar system of claim 5, wherein the first direction is perpendicular to the second direction.

9. The vehicle radar system of claim 5, further comprising a first power divider, coupled between the first millimeter-wave detection module and the antenna strings of the first group.

10. The vehicle radar system of claim 5, wherein the data fusion unit determines that a first target within the plurality of first targets and a second target within the plurality of second targets are identical targets when the first detection result and the second detection result indicate that a difference between a first dynamic information of the first target and a second dynamic information of the second target is smaller than a threshold value.

11. The vehicle radar system of claim 5, wherein the data fusion unit determines a dynamic information in 3-D space of the at least an identical target corresponding to the vehicle radar system according to the dynamic information of the at least an identical target in the azimuth dimension and the elevation dimension.

12. The vehicle radar system of claim 5, wherein dynamic information of the plurality of first targets or the plurality of second targets corresponding to the vehicle radar system are selected from one or more of positions, distances, angles and velocities of the plurality of first targets or the plurality of second targets corresponding to the vehicle radar system.

* * * * *